United States Patent
Ogawa et al.

(10) Patent No.: US 9,165,714 B2
(45) Date of Patent: Oct. 20, 2015

(54) ELECTRONIC COMPONENT

(75) Inventors: Makoto Ogawa, Nagaokakyo (JP);
Akihiro Motoki, Nagaokakyo (JP);
Atsuko Saito, Nagaokakyo (JP); Kenji Masuko, Nagaokakyo (JP); Toshinobu Fujiwara, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 1 day.

(21) Appl. No.: 13/479,397

(22) Filed: May 24, 2012

(65) Prior Publication Data
US 2012/0314336 A1 Dec. 13, 2012

(30) Foreign Application Priority Data
Jun. 7, 2011 (JP) .................. 2011-126905

(51) Int. Cl.
*H01G 4/228* (2006.01)
*H01G 2/20* (2006.01)
*H01G 4/008* (2006.01)
*C25D 5/12* (2006.01)
*C25D 3/30* (2006.01)
*C25D 3/12* (2006.01)

(52) U.S. Cl.
CPC .................. *H01G 4/008* (2013.01); *C25D 5/12* (2013.01); *C25D 3/12* (2013.01); *C25D 3/30* (2013.01)
USPC ...................... 361/306.3; 361/308.1

(58) Field of Classification Search
USPC ................. 361/306.1, 306.3, 308.1, 309
See application file for complete search history.

(56) References Cited

U.S. PATENT DOCUMENTS

| 6,396,680 | B1* | 5/2002 | Nishiyama et al. | 361/311 |
| 6,960,366 | B2* | 11/2005 | Ritter et al. | 427/79 |
| 7,329,976 | B2* | 2/2008 | Shirasu et al. | 310/366 |
| 7,433,173 | B2* | 10/2008 | Iwasaki et al. | 361/321.4 |
| 7,463,474 | B2* | 12/2008 | Ritter et al. | 361/306.1 |
| 7,719,852 | B2* | 5/2010 | Horie et al. | 361/763 |
| 8,154,848 | B2* | 4/2012 | Motoki et al. | 361/306.1 |

(Continued)

FOREIGN PATENT DOCUMENTS

| JP | 2007-239076 A | 9/2007 |
| JP | 2007-254860 A | 10/2007 |
| JP | 2008-166645 A | 7/2008 |
| JP | 2010-244944 A | 10/2010 |

OTHER PUBLICATIONS

English translation of Official Communication issued in corresponding Japanese Patent Application No. 2011-126905, mailed on Jul. 17, 2013.

(Continued)

*Primary Examiner* — Eric Thomas
(74) *Attorney, Agent, or Firm* — Keating & Bennett, LLP

(57) ABSTRACT

An electronic component, preferably in the form of a laminated ceramic capacitor, which suppresses the growth of whiskers and has excellent solderability, includes an electronic component element in the shape of, for example, a rectangular parallelepiped. External electrodes of terminal electrodes are located on first and second end surfaces of the electronic component element. First plated films including plated Ni are located on the surfaces of the external electrodes. Second plated films are located on the surfaces of the first plated films. The second plated films have stacked structures including first plated layers and second plated layers. The second plated layers have lower degrees of densification than the first plated layers.

5 Claims, 3 Drawing Sheets

(56) References Cited

U.S. PATENT DOCUMENTS

| | | |
|---|---|---|
| 2005/0046536 A1* | 3/2005 | Ritter et al. ............ 336/200 |
| 2006/0245141 A1* | 11/2006 | Shirasu et al. ........... 361/303 |
| 2007/0224444 A1 | 9/2007 | Sakuyama |
| 2010/0040899 A1 | 2/2010 | Nomura et al. |

OTHER PUBLICATIONS

Official Communication issued in corresponding Japanese Patent Application No. 2011-126905, mailed on Jul. 17, 2013.

* cited by examiner

ELECTRONIC COMPONENT

BACKGROUND OF THE INVENTION

1. Field of the Invention

The present invention relates to an electronic component, and more particularly, to an electronic component such as, for example, a laminated ceramic capacitor, which includes plated layers with different degrees of densification.

2. Description of the Related Art

A conventional technique involves forming an Sn plated film free of the influence of underlying metal without causing whiskers under severe conditions of a thermal cycle test (see Japanese Patent Application Laid-Open No. 2007-239076).

Sn—Pb alloy plating has been used to provide a solution, because Sn plated layers cause needle-like whiskers over time. However, from the standpoint of recent environmental protection, the demand for Pb-free solder has been increased remarkably due to tightened restrictions on the use of Pb. Therefore, the Sn—Pb alloy plating has been completely avoided, in place of solder, Sn materials have been reconsidered which are also excellent in terms of solderability, and Sn plated layers have been used for the formation of current-conducting connections such as terminals of electronic components. However, as described above, the formation of films made of such Sn plated layers makes the films likely to have needle-like Sn whiskers. If whiskers occur and grow, electrical failures due to short circuits are likely to be caused between adjacent electrodes. In addition, if the whiskers become detached and fly away from the films, the flying whiskers will cause failures due to short circuits inside and outside the system.

The technique disclosed in Japanese Patent Application Laid-Open No. 2007-239076, which is aimed at providing a member including a film which can suppress the development of such whiskers, provides a Sn plated film obtained by electrolyzation of an Sn plating solution, and the Sn plated film includes compressive stress therein, which is characteristically 1 MPa or more when measured by a spiral method.

While in general, Sn whiskers are known to be grown when compressive stress is applied to Sn films, in the Sn plating film disclosed in Japanese Patent Application Laid-Open No. 2007-239076, the Sn plated film already includes compressive stress therein, and thus, has an environment in which whiskers are likely to extend because of having no room to relax the stress. In addition, the actual evaluation of a plating bath disclosed in Japanese Patent Application Laid-Open No. 2007-239076 has failed to confirm the fact that whiskers are less likely to extend as compared with other plating baths.

SUMMARY OF THE INVENTION

Therefore, preferred embodiments of the present invention provide an electronic component which suppresses and prevents the growth of whiskers and has excellent solderability.

An electronic component according to a preferred embodiment of the present invention includes an electrode including an Sn plated film defining an outermost layer, wherein the Sn plated film has a stacked structure including at least two plated layers with different degrees of densification from each other, and an uppermost plated layer of the plated layers has a lowest degree of densification of the at least two plated layers.

In the electronic component according to a preferred embodiment of present invention, the uppermost plated layer preferably includes a surface including more than one gap extending in a direction parallel or substantially parallel to a stacking direction of the stacked structure.

In addition, in the electronic component according to a preferred embodiment of the present invention, the uppermost plated layer preferably has a thickness of about 0.3 μm or more, for example.

In addition, in the electronic component according to a preferred embodiment of the present invention, a lower plated layer under the uppermost plated layer preferably has a thickness of about 1 μm or more.

The electronic component according to various preferred embodiments of the present invention is provided with the electrode including the Sn plated film defining the outermost layer, wherein the Sn plated film has a stacked structure including at least two plated layers with different degrees of densification from each other, and an uppermost plated layer has a lowest degree of densification of the at least two plated layers. As a result, the growth of whiskers can be suppressed and prevented, and the solderability can be enhanced. This is because the lowest densification plated layer defining the uppermost layer suppresses and prevents the growth of whiskers when compressive stress is applied, and even if the uppermost plated layer undergoes oxidation to decrease the effect of solderability, for example, the higher densification plated layer defining the underlying layer located under the uppermost plated layer can maintain the effects of solderability.

In addition, in the electronic component according to various preferred embodiments of the present invention, the uppermost plated layer includes a surface including more than one gap extending in a direction parallel or substantially parallel to the stacking direction of the stacked structure. Thus, the growth of whiskers which are grown when compressive stress is applied can be further suppressed and prevented.

In the electronic component according to various preferred embodiments of the present invention, the uppermost plated layer defined by the Sn plated film, which preferably has a thickness of about 0.3 μm or more, can suppress and prevent the growth of whiskers with more certainty and reliability.

In addition, in the electronic component according to various preferred embodiments of the present invention, the higher densification plated layer defining a lower layer of the Sn plated film, which preferably has a thickness of about 1 μm or more, can further enhance the effect of solderability.

According to various preferred embodiments of the present invention, an electronic component can be achieved which suppresses and prevents the growth of whiskers and has excellent solderability.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
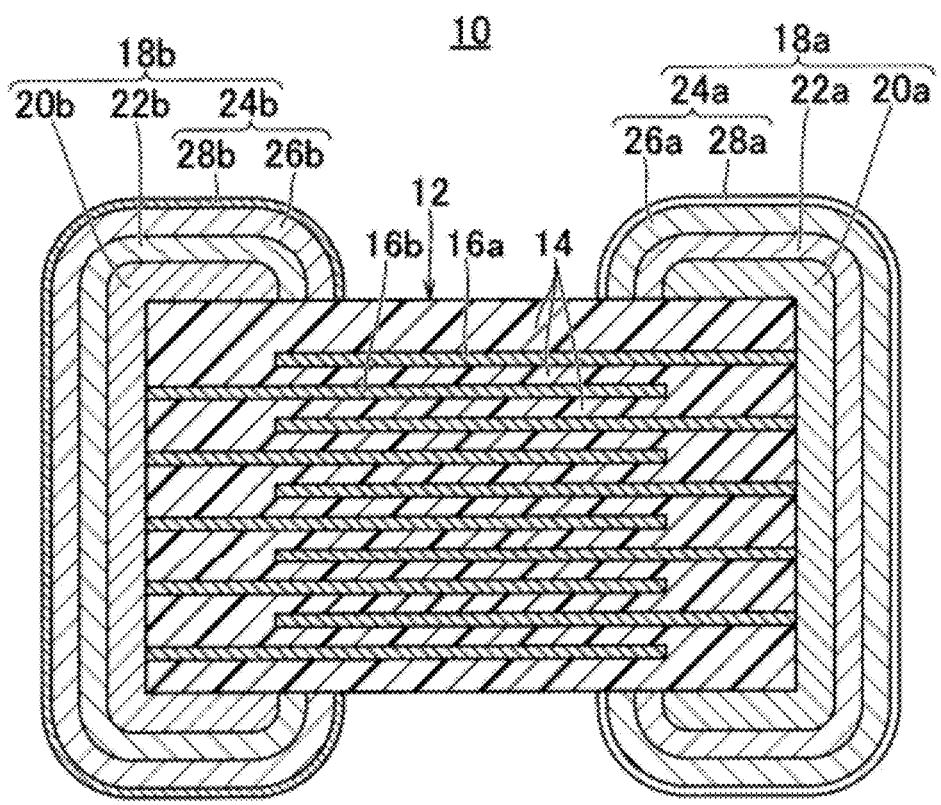
FIG. 1 is a cross-sectional view schematically illustrating an example of a laminated ceramic capacitor according to a preferred embodiment of the present invention.

FIG. 1 is a cross-sectional view schematically illustrating an example of a laminated ceramic capacitor according to a preferred embodiment of the present.

The laminated ceramic capacitor 10 shown in FIG. 1 includes a ceramic element 12 preferably in the shape of a rectangular parallelepiped, for example. The ceramic element 12 includes, as a dielectric body, a number of ceramic layers 14 preferably made of, for example, a barium titanate based dielectric ceramic. The ceramic layers 14 are stacked, and internal electrodes 16a and 16b preferably made of, for example, Ni are alternately stacked between the ceramic layers 14.

In this case, the internal electrodes 16a each preferably include a first end extending to one end of the ceramic element 12. In addition, the internal electrodes 16b each preferably include a second end extending to the other end of the ceramic element 12.

Furthermore, the internal electrodes 16a and 16b are preferably arranged such that their intermediate portions and second ends are overlapped with each other with the ceramic layers 14 interposed therebetween. Thus, the ceramic element 12 includes a stacked structure including therein the plurality of internal electrodes 16a and 16b provided with the ceramic layers 14 interposed therebetween.

On one end surface of the ceramic element 12, a terminal electrode 18a is arranged so as to be connected to the internal electrodes 16a. Likewise, on the other end surface of the ceramic element 12, a terminal electrode 18b is arranged so as to be connected to the internal electrodes 16b.

The terminal electrode 18a includes an external electrode 20a preferably made of, for example, Cu. The external electrode 20a is arranged on one end surface of the ceramic element 12 so as to be connected to the internal electrodes 16a. Likewise, the terminal electrode 18b includes an external electrode 20b preferably made of, for example, Cu. The external electrode 20b is arranged on the other end surface of the ceramic element 12 so as to be connected to the internal electrodes 16b.

In addition, first plated films 22a and 22b preferably containing Ni, for example, are arranged respectively on the surfaces of the external electrodes 20a and 20b to prevent solder leach.

Figure 2:
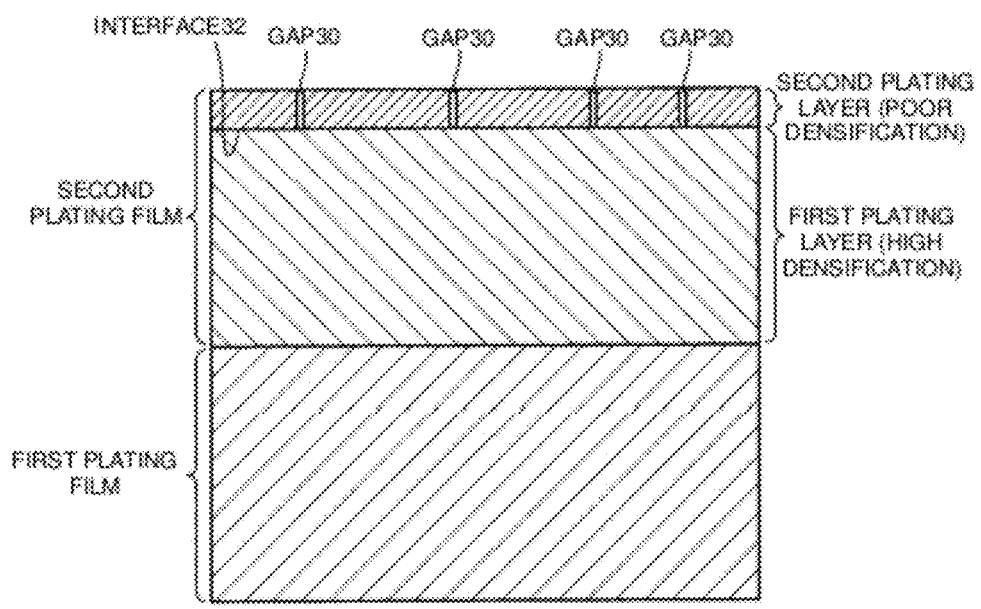
FIG. 2 is a schematic view of a cross section of a first plated film and a second plated film cut in the thickness direction, in a laminated ceramic capacitor according to Example 1.

Furthermore, as shown in FIG. 2, second plated films 24a and 24b preferably containing Sn, for example, are arranged respectively on the surfaces of the first plated films 22a and 22b, in order to enhance solderability. The second plated films 24a and 24b preferably include first plated layers 26a and 26b and second plated layers 28a and 28b. The first plated layers 26a and 26b define lower layers located under the second plated layers 28a and 28b. Thus, the second plated films 24a and 24b each include a stacked structure.

Further, FIG. 2 is a schematic view of a cross section of the first plated films 22a and 22b and second plated films 24a and 24b cut in the thickness direction.

The first plated layers 26a and 26b preferably define highly dense plated layers.

The first plated layers 26a and 26b preferably have a thickness of about 1 μm or more and about 10 μm or less, for example. When the first plated layers 26a and 26b have a thickness of about 1 μm or more, the effect of solderability can be further enhanced, and furthermore, the first plated films 22a and 22b can be covered with more certainty. In addition, the first plated layers 26a and 26b more preferably have a thickness of about 4 μm or less, because the laminated ceramic capacitor 10 can be significantly reduced in size.

In addition, as the uppermost layers of the second plated films 24a and 24b, the second plated layers 28a and 28b are preferably further provided on the surfaces of the first plated layers 26a and 26b. These second plated layers 28a and 28b preferably are less dense plated layers, as compared with the first plated layers 26a and 26b. Thus, because the second plated layers 28a and 28b preferably are less dense plated layers, more than one gap 30 is formed and extends in a direction parallel or substantially parallel to the stacking directions in the stacked structures of the second plated films 24a and 24b. The second plated layers 28a and 28b preferably have a thickness of about 0.3 μm or more and about 3 μm or less. When the second plated layers 28a and 28b preferably have a thickness of about 0.3 μm or more, the growth of whisker can be suppressed and prevented with more certainty. In addition, the second plated layers 28a and 28b more preferably have a thickness of about 1 μm or less, because the laminated ceramic capacitor 10 can be significantly reduced in size.

Thus, because the first plated layers 26a and 26b differ from the second plated layers 28a and 28b in the degree of densification, interfaces 32 are formed between the first plated layers 26a and 26b and the second plated layers 28a and 28b, as a result of the difference in the degree of densification between the respective layers.

Next, a non-limiting example of a method for manufacturing a laminated ceramic capacitor will be described for manufacturing the laminated ceramic capacitor 10 shown in FIG. 1.

First, prepared are ceramic green sheets, a conductive paste for internal electrodes, and a conductive paste for external electrodes. The ceramic green sheets and respective conductive pastes each contain a binder and a solvent, for which known organic binders and organic solvents can be used.

Next, on the ceramic green sheets, the conductive paste for internal electrodes is printed by, for example, screen printing or other suitable method, in accordance with a predetermined pattern to form an internal electrode pattern.

Then, a mother laminated body is prepared by stacking a predetermined number of ceramic green sheets for outer layers without any internal electrode pattern printed, sequentially stacking thereon the ceramic green sheets with the internal electrode pattern printed, and stacking thereon a predetermined number of ceramic green sheets for outer layers.

Then, the mother laminated body is pressed in the stacking direction by an isostatic press or other suitable device or process.

Then, the pressed mother laminated body is cut into a predetermined size to cut out a raw ceramic laminate. It is to be noted that the raw ceramic laminate may have corners or ridges rounded by barrel polishing or other suitable process.

Then, the raw ceramic laminate is subjected to firing. In this case, the firing temperature is preferably about 900° C. to about 1300° C., for example, depending on the materials of the ceramic layers 14 and internal electrodes 16a and 16b. The fired ceramic laminate serves as the ceramic element 12 including the ceramic layers 14 and the internal electrodes 16a and 16b in the laminated ceramic capacitor 10.

Then, the conductive paste for external electrodes is applied onto both end surfaces of the fired ceramic laminate, and subjected to firing, thereby forming the external electrodes 20a and 20b of the terminal electrodes 18a and 18b.

Then, the surface of the first external electrode 20a and the surface of the second external electrode 20b are each subjected to, for example, Ni plating to form the first plated films 22a and 22b.

Then, the surfaces of the first plated films 22a and 22b are each subjected to Sn plating to form the highly dense first plated layers 26a and 26b of the second plated films 24a and 24b.

Then, furthermore, Sn plating is applied to the surfaces of the first plated layers 26a and 26b to form the less dense second plated films 28a and 28b respectively as the uppermost layers of the second plated films 24a and 24b. Thus, the first plated layers 26a and 26b are formed for lower layers under the second plated layers 28a and 28b. Thus, the second plated films 24a and 24b are each composed of a stacked structure.

As described above, the first plated films 22a and 22b and the second plated films 24a and 24b are formed, and then dried.

In the way described above, the laminated ceramic capacitor 10 shown in FIG. 1 is manufactured.

In the laminated ceramic capacitor 10 shown in FIG. 1, for example, Sn is preferably used as a material to form less dense plated layers as the second plated layers 28a and 28b for the uppermost layers of the second plated films 24a and 24b, and the growth of whiskers can be thus suppressed and prevented. Therefore, this laminated ceramic capacitor 10 can prevent failures due to short circuits caused by whiskers.

In addition, the laminated ceramic capacitor 10 shown in FIG. 1 has good solderability, because the first plated layers 26a and 26b preferably contain Sn in the second plated films 24a and 24b.

Furthermore, the laminated ceramic capacitor 10 shown in FIG. 1 can prevent solder leach, because the first plated films 22a and 22b each preferably contain Ni.

Moreover, the laminated ceramic capacitor 10 shown in FIG. 1 is also excellent from the standpoint of environmental protection, because no Pb is used for the first plated films 22a and 22b and the second plated films 24a and 24b, etc.

EXPERIMENTAL EXAMPLE

In a non-limiting experimental example, the following laminated ceramic capacitors according to Example 1, Comparative Example 1, and Comparative Example 2 were produced, and evaluated for whiskers in the films.

Example 1

In Example 1, the laminated ceramic capacitor 10 shown in FIG. 1 was produced by the method described above. In this example, the laminated ceramic capacitor 10 had outside dimensions of 2.0 mm in length, 1.25 mm in width, and 1.25 mm in height. In addition, a barium titanate based dielectric ceramic was used as the ceramic layers 14. Furthermore, Ni was used as a material for the internal electrodes 16a and 16b. Furthermore, Cu was used as a material for the external electrodes 20a and 20b.

In addition, in Example 1, the first plated films 22a and 22b and the second plated films 24a and 24b were formed under the following conditions.
(1) Plating Bath
The composition of a plating bath for forming the first plated films: nickel sulfate 300 g/L, nickel chloride 45 g/L, and boric acid 40 mg/L; pH: 4.0; and bath temperature: 55° C. were used.

The plating bath for forming the first plated layers of the second plated films: NB-RZS from Ishihara Chemical Co., Ltd. was used at a bath temperature of 30° C. and pH: 4.5. These first plated layers are formed as highly dense plated layers.

The composition of a plating bath for forming the second plated layers of the second plated films: a Sn sulfate bath (stannous sulfate 50 g/L, di-ammonium hydrogen citrate 100 g/L, ammonium sulfate 150 g/L); bath temperature: 30° C.; and pH: 4.5. These second plated layers are formed as less dense plated layers.
(2) Conduction Condition
First Plated Films: the first plated films were made to have a film thickness of 3 μm at an electric current of 10 A for 75 minutes.

First Plated layers of Second Plated Films: the first plated layers were made to have a film thickness of 3 μm at an electric current of 6 A for 30 minutes.

Second Plated layers of Second Plated Films: the second plated layers were made to have a film thickness of 1 μm at an electric current of 2 A for 30 minutes.
(3) Plating System
The plating system for forming the first plated films, as well as the first plated layers and second plated layers of the second plated films: the plating system was achieved with the use of a rotating barrel of 300 ml in volume and 70 mm in diameter. For media, 40 ml of balls was used which included Sn as a material and had a diameter of 0.7 mm. For stirring balls, 50 cc of nylon-coated iron balls of 8.0 mm in diameter was used. The amount of chip charging was adjusted to 20 ml. In addition, the barrel rotation speed was adjusted to 20 rpm.

As described above, the first plated films, as well as the first plated layers and second plated layers of the second plated films were formed, and then dried in the air at 80° C. for 15 minutes. It is to be noted that cleaning with pure water was carried out for each formation after forming the first plated films, as well as the first plated layers and second plated layers of the second plated films.

Comparative Example 1

In Comparative Example 1, while the Ni plated films (first plated films) and the Sn plated films (second plated films) were formed as in the case of Example 1, only the highly dense first plated layers were formed as the second plated films, whereas the less dense second plated layers were not formed. It is to be noted that the plating bath for forming the second plated films in Comparative Example 1 was the same as the plating bath used for the first plated layers of the second plated films in Example 1. In addition, the conduction condition for forming the second plated films was made an electric current of 6 A for 40 minutes, and the second plated films were made to have a film thickness of 4 μm.

Comparative Example 2

In Comparative Example 2, while the Ni plated films (first plated films) and the Sn plated films (second plated films) were formed as in the case of Example 1, only the less dense second plated layers were formed as the second plated films, whereas the highly dense first plated layers were not formed. It is to be noted that the plating bath for forming the second plated films in Comparative Example 2 was the same as the plating bath used for the second plated layers of the second plated films in Example 1. In addition, the conduction condition for forming the second plated films was made an electric current of 6 A for 40 minutes, and the second plated films were made to have a film thickness of 4 μm.

Next, the respective laminated ceramic capacitors according to Example 1, Comparative Example 1, and Comparative Example 2 were evaluated for the growth of whiskers caused in the plated films, in conformity with the following JEDEC standard. The evaluation for the growth of whiskers was carried out by a thermal shock test and a shelf test in moisture as described below. The thermal shock test was carried out mainly for evaluating the growth of whiskers caused by the difference in coefficient of thermal expansion, whereas the shelf test in moisture was carried out mainly for evaluating the growth of whiskers caused by galvanic corrosion.

(Thermal Shock Test) • The Number of Samples (The Number of Electrodes): 6; •Test Conditions: −55° C. (+0/−10) as Minimum Temperature, and 85° C. (+10/−0) as Maximum Temperature; and keeping at each temperature for 10 minutes to give a thermal shock 1500 times in a gas phase.

Observation Method: observations made for electron micrographs magnified 1000 times with the use of a scanning electron microscope (SEM)

Criterion: Class 2 (communications infrastructure equipment, automotive equipment) was applied to make a determination of goodness when the maximum whisker length (straight line length) was less than 45 μm, or, make a determination of no goodness when the maximum whisker length was 45 μm or more, for each sample of Example 1, Comparative Example 1, and Comparative Example 2.

(Shelf Test in Moisture) • The Number of Samples (The Number of Electrodes): 6; •Test Conditions: Ambient Temperature of 55° C. (+0/−10), and Humidity of 85% RH; and leaving for 4000 hours.

Observation Method: observations made for electron micrographs magnified 1000 times with the use of a scanning electron microscope (SEM)

Criterion: Class 2 (communications infrastructure equipment, automotive equipment) was applied to make a determination of goodness when the maximum whisker length (straight line length) was less than 45 μm, or, make a determination of no goodness when the maximum whisker length was 45 μm or more, for each sample of Example 1, Comparative Example 1, and Comparative Example 2.

In addition, the respective laminated ceramic capacitors according to Example 1, Comparative Example 1, and Comparative Example 2 were evaluated for solderability. The evaluation was carried out by a solderability evaluation test as described below.

Solderability Evaluation Test

In the solderability evaluation test, the laminated ceramic capacitors obtained in Example 1, Comparative Example 1, and Comparative Example 2, with the use of flux C (rosin-ethanol), were immersed in a solder bath (245° C.) of lead-free solder M705 (Sn-3Ag-0.5Cu). A solderability testing machine (SAT-5000 from RHESCA) was used to evaluate the solderability in Example 1, Comparative Example 1, and Comparative Example 2, on the basis of the zero cross time in accordance with a solder microsphere balance method.

In this case, as a criterion, the average value of the zero cross time not more than 2 seconds was determined as goodness (Corresponding Standard: International Standard IEC60068-2-69, Japanese Industrial Standard JISC60068-2-69).

Figure 3:
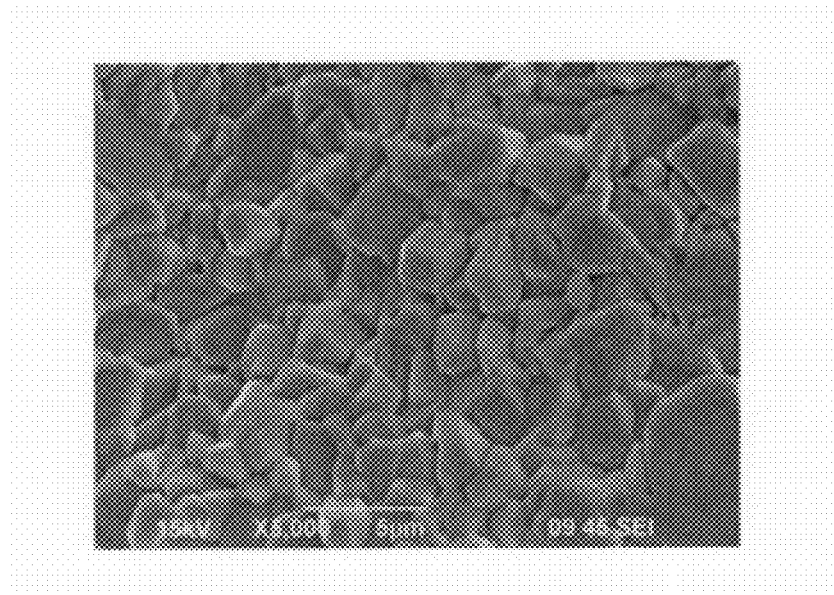
FIG. 3 is an electron micrograph taken from above vertical to the surface of a second plated layer of the second plated film in the laminated ceramic capacitor according to Example 1.

FIG. 3 shows an electron micrograph taken from above, vertical to the surface of the second plated layer of the second plated film defining the uppermost layer in the laminated ceramic capacitor according to Example 1. In addition, Table 1 shows the test results and determination results for each of Example 1, Comparative Example 1, and Comparative Example 2. In Table 1, the case of the evaluation result which satisfies the criterion is shown as "G", whereas the case of the evaluation result which fails to satisfy the criterion is shown as "NG".

TABLE 1

| Corresponding Example | Whisker Length in Thermal Shock Test | Whisker Length in Shelf Test in Moisture | Determination on Whisker | Solderability Evaluation Test |
|---|---|---|---|---|
| Example 1 | 30 μm | 0 μm | G | G |
| Comparative Example 1 | 60 μm | 0 μm | NG | G |
| Comparative Example 2 | 20 μm | 60 μm | NG | NG |

First, referring to the results of the thermal shock test, the maximum whisker length of 30 μm satisfies the criterion in the case of Example 1.

On the other hand, the maximum whisker length of 60 μm fails to satisfy the criterion in the case of Comparative Example 1, whereas the maximum whisker length is 20 μm in the case of Comparative Example 2.

As for the reason that Example 1 and Comparative Example 2 achieved the good results in the thermal shock test, the surface of the plated layer is roughened, and not formed as a planar surface as shown in FIG. 3 by adopting the plated layers with the different degrees of densification from each other for the Sn plated film, and adopting the less dense plated layer for the uppermost Sn plated layer, while it is considered, as a cause of the whiskers, that stress concentrated on a point of the surface layer section of the Sn plated film extrudes the surface layer section. Therefore, the reason that no whisker is grown is because the surface layer section of the plated layer was vertically divided to create gaps, and thereby avoid the local concentration of stress. In addition, it is considered that the interface contributes to relaxation of stress concentration, because the interface is formed by the Sn plated film composed of the stacked structure of the plated layers with the different degrees of densification from each other.

Next, referring to the results of the shelf test in moisture, the maximum whisker length of 0 μm satisfies the criterion in the case of Example 1.

On the other hand, the maximum whisker length of 0 μm satisfies the criterion in the case of Comparative Example 1, whereas the maximum whisker length of 60 μm fails to satisfy the criterion in the case of Comparative Example 2.

In the shelf test in moisture, the growth of whiskers was suppressed in Example 1, because the interface between the highly dense plated layer and the less dense plated layer suppressed and prevented the growth of whiskers.

In addition, referring to the results of the solderability evaluation test, the test result for solderability satisfies the criterion in the case of Example 1.

On the other hand, the test result for solderability satisfies the criterion in the case of Comparative Example 1, whereas the test result for solderability fails to satisfy the criterion in the case of Comparative Example 2.

The reason that Example 1 and Comparative Example 1 achieved the good results in the solderability evaluation test is due to the fact that the reduced degree of densification in the entire Sn plated film fails to cover the underlying Ni plated film. In addition, another reason is because the oxidation of the Sn plated film itself is developed to decrease the solderability significantly.

It is to be noted that while the second plated film including the stacked structure of the plated layers with the different degrees of densification from each other preferably includes two layers including the less dense Sn plated layer for the uppermost layer and the highly dense Sn plated layer for the underlying layer in the preferred embodiment and Example 1 described above.

The present invention is not limited to the two layers described above, and more layers may be adopted as long as the uppermost plated layer is a less dense plated layer, whereas the underlying plated layer located under the uppermost plated layer is a highly dense plated layer.

While the barium titanate based dielectric ceramic is preferably used as a dielectric body in the preferred embodiments and Example 1 described above, for example, a calcium titanate, strontium titanate, or calcium zirconate based dielectric ceramic may be used instead. In addition, materials with accessory constituents added, such as, for example, Mn compounds, Mg compounds, Si compounds, Co compounds, Ni compounds, and rare-earth compounds, may also be used as a ceramic material for the ceramic layers 14.

While Ni is preferably used as the internal electrodes in the preferred embodiments and Example 1 described above, Cu, Ag, Pd, Ag—Pd alloys, Au, etc., for example, may also be used instead.

While Cu is preferably used as the external electrodes in the preferred embodiments and Example 1 described above, one metal selected from the group consisting of Ag, Au, and Sn, or alloys containing the metal, for example, may also be used instead.

An electronic component according to various preferred embodiments of the present invention is preferably used, in particular, for electronic components such as, for example, high-density mounted laminated ceramic capacitors.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. An electronic component comprising:
an electrode including an Sn plated film defining an outermost layer; and
a Ni plated film arranged directly under the Sn plated film; wherein
the Sn plated film has a stacked structure including at least two plated layers with different degrees of densification from each other;
the Sn plated film has a thickness of about 7 µm less;
a plated layer of the at least two plated layers that contacts the Ni plated film has a thickness of about 1 µm or more; and
an uppermost plated layer of the at least two plated layers has a lowest degree of densification of the at least two plated layers.

2. The electronic component according to claim 1, wherein the uppermost plated layer includes a surface with more than one gap extending in a direction parallel or substantially parallel to a stacking direction of the stacked structure.

3. The electronic component according to claim 1, wherein the uppermost plated layer has a thickness of about 0.3 µm or more.

4. The electronic component according to claim 1, wherein the plated layer of the at least two plated layers that contacts the Ni plated film has a thickness of about 1 µm to about 4 µm.

5. The electronic component according to claim 1, wherein the uppermost plated layer of the at least two plated layers of the Sn plated film has a thickness of about 0.3 µm to about 1 µm.

* * * * *